United States Patent [19]

Massa et al.

[11] Patent Number: 5,001,823

[45] Date of Patent: Mar. 26, 1991

[54] METHOD OF REMOVING A COLLET FROM A RETAINER

[75] Inventors: Ted R. Massa, Latrobe; David R. Siddle, Greensburg, both of Pa.

[73] Assignee: Kennametal Inc., Latrobe, Pa.

[21] Appl. No.: 479,904

[22] Filed: Feb. 14, 1990

Related U.S. Application Data

[62] Division of Ser. No. 380,822, Jul. 17, 1989, Pat. No. 4,928,373.

[51] Int. Cl.[5] .............................................. B23P 19/04

[52] U.S. Cl. .................................................... 29/426.6

[58] Field of Search ....................... 29/221.5, 225, 243, 29/255, 270, 272, 278, 280, 426.5, 426.6; 81/124.1; 279/52, 59

[56] References Cited

U.S. PATENT DOCUMENTS

| | | | |
|---|---|---|---|
| 2,495,040 | 1/1950 | Walden | 29/221.5 |
| 2,797,471 | 7/1957 | Hamberger | 29/278 |
| 2,924,481 | 2/1960 | Wagstaff | 81/124.1 |
| 4,821,401 | 4/1989 | Williams | 29/225 X |

FOREIGN PATENT DOCUMENTS

| | | | |
|---|---|---|---|
| 909919 | 11/1962 | United Kingdom | 29/426.6 |

OTHER PUBLICATIONS

Sandvik Coromant Metalworking Products catalog, "Rotating Tools and Inserts," (1988).

*Primary Examiner*—Joseph M. Gorski
*Assistant Examiner*—Peter Dungba Vo
*Attorney, Agent, or Firm*—Larry R. Meenan

[57] ABSTRACT

The present invention entails a collet tool for removing a collet from a circumferential retainer and for inserting that collet or another collet into a retainer. The tool includes an elongated sleeve having a collet receiving section formed about one end and a plunger reciprocally mounted within the opposite end of the sleeve. To remove a collet from a retainer, the free end of the collet is inserted into the collet receiving section and the sleeve is pressed onto the collet causing the collet to be radially compressed and lodged within the sleeve and released from its associated retainer. To eject the collet from the sleeve, the plunger is moved into engagement with the collet and the collet is pushed from the sleeve.

A collet may be readied for insertion into a retainer by inserting the rear portion of the collet into the collet receiving section. The sleeve is pressed on to the free end of the collet, causing the same to be radially compressed and lodged in the sleeve. To insert a collet into the retainer, the end portion of the collet opposite the free end is inserted into the retainer and the plunger is moved into engagement with the collet and the collet pushed from the sleeve. Once the collet has been ejected from the sleeve, the same may radially expand within the retainer.

2 Claims, 2 Drawing Sheets

METHOD OF REMOVING A COLLET FROM A RETAINER

This is a divisional of copending application(s) Ser. No. 07/380,822 filed on July 17, 1989 now U.S. Pat. No. 4,928,373.

BACKGROUND OF THE INVENTION

The present invention relates to collet tools, and more particularly to a hand held collet tool capable of removing and inserting collets into a circumferential retainer Collets are typically used in conjunction with chucks to hold tools such as drill bits, etc. Most single angled collets have a tendency to stick in the chuck. This is because the tapered angle of the collet is usually so shallow that the collets stick in the chuck after the clamping force has been removed. In order to change collets, there is a need to overcome this "self sticking" tendency and pull the collet from the chuck. To accomplish this, some collets are designed such that their forward end portion can be confined within a retainer, typically referred to as a nose piece. To confine the forward end portion of the collet within a nose piece, it is accepted practice to form a circular retaining ring about the forward end of the collet and provide a circular groove within the nose piece for receiving and retaining the retaining ring formed about the collet Thus, when the nose piece is secured to the collet, the collet can be easily pulled from the chuck.

The problem now becomes one of removing and re-inserting a collet within the nose piece. This is often a very difficult and frustrating exercise, not to mention the potential damage that can be done to the collet and nose piece in the process. For example, it is not uncommon for an individual attempting to remove a collet from a nose piece to apply a side force to the rear or free end of the collet. In applying the side force attempting to pull the collet from the nose piece, it is very easy to mar the collet by impacting the collet with the sharp thread forms of the nose piece. Beyond that, by attempting to remove the collet by applying side forces produces very asymmetric stresses on the collet which is a precision device that needs to be treated and handled with care at all times.

There are collet removal tools commercially available. For example, Sandvik offers a ring type collet removal tool. Essentially, this device is nothing more than a ring designed to be inserted over the free or tapered end of the collet. By moving the ring toward the opposite end of the collet, the collet is compressed such that it can be removed from its associated nose piece. The ring type collet tool has a number of shortcomings. First, it is difficult to press a ring type collet tool over a collet, especially if the resistance to compression is substantial. Beyond that, there is no easy and convenient way to eject the collet from the ring once it has been lodged within the ring tool. Again, this problem becomes of greater concern when the collet is tightly held within the tool.

Therefore, there is and continues to be a need for a simple collet handling tool that is capable of both removing a collet from a nose piece and re-inserting the collet into the nose piece.

SUMMARY AND OBJECTS OF THE PRESENT INVENTION

The present invention provides a collet tool that is capable of both removing a collet from a nose piece and inserting that collet, or another collet, back into a nose piece. To accomplish this, the present invention entails a collet tool comprising an elongated sleeve having an open end section that forms a collet receiving area and a plunger reciprocally mounted within the sleeve adjacent the collet receiving area. To engage a collet into the tool, whether it be just to remove a retained collet in a nose piece or just a free collet resting on a surface, the rear or free end of the collet is inserted within the open end portion of the sleeve. Next, the sleeve is actually pressed onto the collet. As the sleeve is moved over the tapered free end toward the front or retained end portion of the collet, this radially compresses the collet and frees the retaining ring of the collet from the internal groove within the nose piece. In the process, the collet has become lodged within the collet receiving end portion of the sleeve.

To dislodge the collet from the tool in order to change to a different collet, the plunger is activated, pushing the collet out from the receiving end. With the collet receiving end free, another collet either previously in a nose piece or lying free on a table may be inserted by repeating the above procedure. To insert a collet back into the nose piece, repeat the above procedure to engage a collet into the tool. The tool is then positioned adjacent the nose piece such that the forward end portion of the collet lies within the nose piece. Next, the plunger is actuated and is pushed into engagement with the collet, causing it to be dislodged from the collet receiving end portion of the sleeve and pushed therefrom. As the collet is ejected from the tool, it tends to radially expand, resulting in the retaining ring of the collet being confined within the groove of the nose piece.

It is, therefore, an object of the present invention to provide a collet tool that is capable of both removing a collet from a retainer or nose piece and inserting a collet back into the nose piece.

Still a further object of the present invention resides in the provision of a collet tool of the character referred to above that is designed to exert a uniform radial compressing action on the collet during the removal process.

Still a further object of the present invention is to provide a collet tool which is designed to be hand held and operated and which is relatively small, light weight and easy to use.

Another object of the present invention resides in the provision of a collet tool of the character referred to above that is of the sleeve type and which incorporates a reciprocally mounted plunger for ejecting a collet held within the tool.

Still a further object of the present invention resides in the provision of a collet removal and insertion tool that is designed to act on the collet in a relatively gentle manner so as to prevent damage to the collet when the same is being removed or inserted into a nose piece or retainer.

Another object of the present invention resides in the provision of a collet removal tool that will quickly and easily remove a collet from a nose piece or insert the collet back into the nose piece.

Other objects and advantages of the present invention will become apparent and obvious from a study of the following description and the accompanying drawings which are illustrative of such invention.

DETAILED DESCRIPTION OF THE INVENTION

Figure 1:
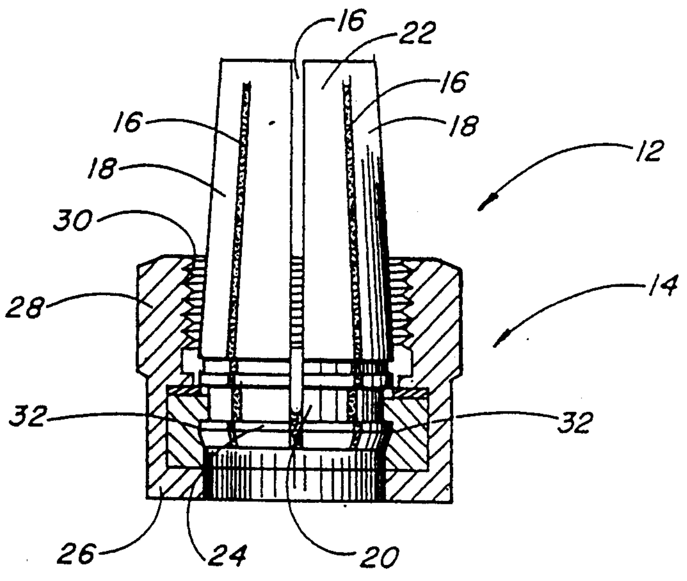
FIG. 1 is an elevational view of a collet retained within a nose piece with portions of the nose piece being broken away to better illustrate the structure of the collet and nose piece.
Figure 2:
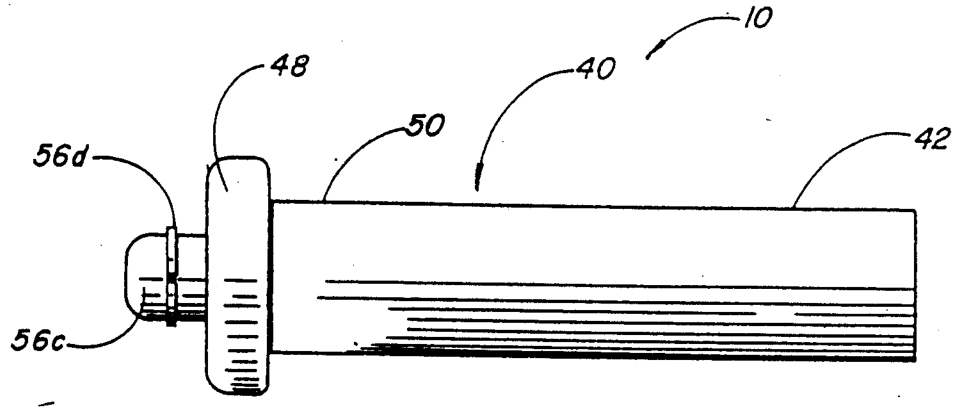
FIG. 2 is a side elevational view of the collet tool of the present invention.
Figure 3:
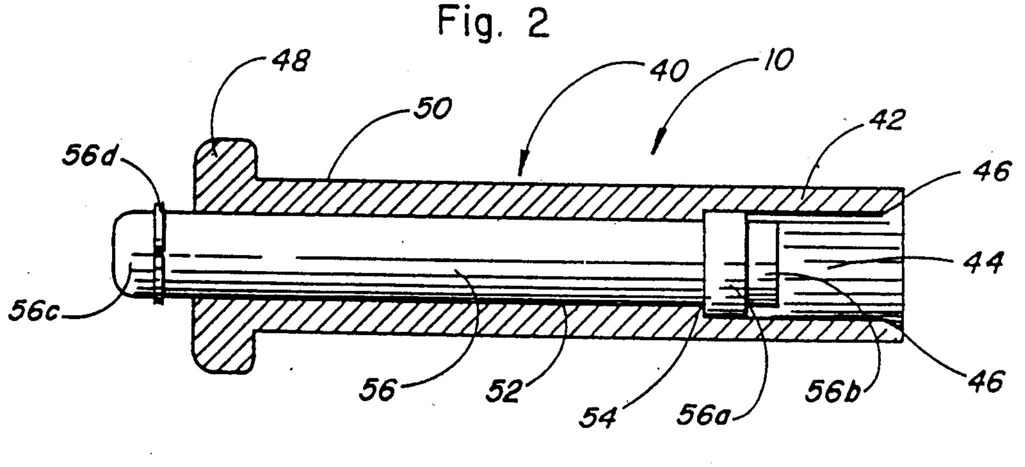
FIG. 3 is a view of the collet tool with the sleeve shown in section.

With further reference of the drawings, particularly FIGS. 2 and 3, the collet tool of the present invention is shown therein and indicated generally by the numeral 10. Collet tool 10 is designed to receive and handle a collet, indicated generally by the numeral 12, and shown in FIG. 1, that is typically retained in a retainer or a nose piece indicated generally by the numeral 14.

Before considering the collet tool, in detail, it may be beneficial to briefly review the structure of the collet 12 and nose piece 14. First, with respect to collet 12, as seen in FIG. 1, the same includes a series of elongated slits 16 that extends substantially the entire distance between the extreme ends of the collet. Formed between the respective slits 16 in circumferential fashion are a series of ribs or panels 18. In conventional fashion, alternating slits 16 extend completely through a respective end of collet 12. It is appreciated that this structure gives the collet the capability to be radially compressed for purposes of holding a tool such as a drill bit, etc.

Collet 12 includes a forward end portion 20 that is sometimes referred to as the retained end portion. Opposite forward end portion 20 is a tapered rear end portion 22 that is sometimes referred to as the free end of the collet. Formed about the forward end portion 20 of the collet is a circular retaining ring 24 that, as will be subsequently understood, cooperates with a nose piece 14 to retain collet 12 within the nose piece.

Now viewing nose piece 14, the same comprises a forward hex head 26 that is integral with a collar 28 that includes internal threads 30 that enable the nose piece 14 to be screwed onto the front portion of a conventional collet chuck. Formed within nose piece 14 is a circular groove 32 that is specifically designed to accept and receive retaining ring 24 of collet 12.

Nose piece 14, collet 12, and the component structure of each are designed such that the collet 12 can be removed from the nose piece 14 and re-inserted back into a nose piece. Typically, to accomplish this requires that the collet 12 be engaged and gripped about the tapered rear end and a compressive force applied causing the outside diameter of the retaining ring 24 to be slightly reduced such that it moves radially inwardly from within the nose piece retaining groove 32 to such a degree that the entire collet 12 can be removed from the nose piece. To re-insert the same collet 12 back into the nose piece 14 requires that a like compressive force be applied to the same area of the collet and that the collet be inserted within the nose piece 14. After that, the compressive force being applied is relieved and the collet structure is allowed to radially expand such that the retaining ring 24 moves into the retaining groove 32 of the nose piece 14.

Turning to the collet tool 10 of the present invention, and particularly FIGS. 2 and 3, it is seen that the tool comprises an elongated sleeve indicated generally by the numeral 40. Sleeve 40 includes a collet receiving end section 42, which is preferably of a lower hardness than the collet, to prevent any damaging scars on the critical tapered section of the collet when engaging the collet. Collet receiving section 42 includes an internal collet receiving area 44 that is formed by a cylindrical bore that extends from one end of the sleeve 40 a selected distance toward the opposite end. Note that the terminal end of collet receiving area 44 includes a tapered inlet 46 that facilitates collet insertion. The tapered inlet 46 preferably has an included angle which is greater than the included angle formed by collet free end.

Sleeve 40 also includes a plunger retaining section 50 and a sleeve flange 48 disposed opposite the collet receiving section 42. Plunger section 50 includes an elongated plunger bore that extends from the sleeve flange 48 to the collet receiving area 44. As seen in the drawings, the plunger bore 52 is, in fact, communicatively open to the collet receiving area 44 and consequently there is formed a continuous opening throughout sleeve 40. It is appreciated that the diameter of plunger bore 52 is less than the diameter of the collet receiving area 54. In the transition area between the plunger bore 52 and the collet receiving area 44, there is formed a shoulder stop 54.

Reciprocally mounted within plunger bore 52 is an elongated plunger 56. Plunger 56 includes a collet engaging end that comprises a collar 56*a* and a terminal plunger end 56*b*. Opposite the collet engaging end of the plunger 56 there is provided an actuator end 56*c* that includes a retaining or stop ring 56*d*.

As viewed in FIG. 3, it is appreciated that plunger 56 has a limited stroke. The stroke of the plunger 56 is limited in one direction by the engagement of collar 56*a* with shoulder stop 54. In the other direction, the stroke of plunger 56 is limited by the engagement of the retaining ring 56*d* with the flange portion 48. For purposes of reference, the plunger assumes a retracted position when collar 56*a* engages shoulder stop 54. When plunger 56 is pushed to where retaining ring 56*d* engages sleeve flange 48, this is referred to as the extended position.

Figure 4:
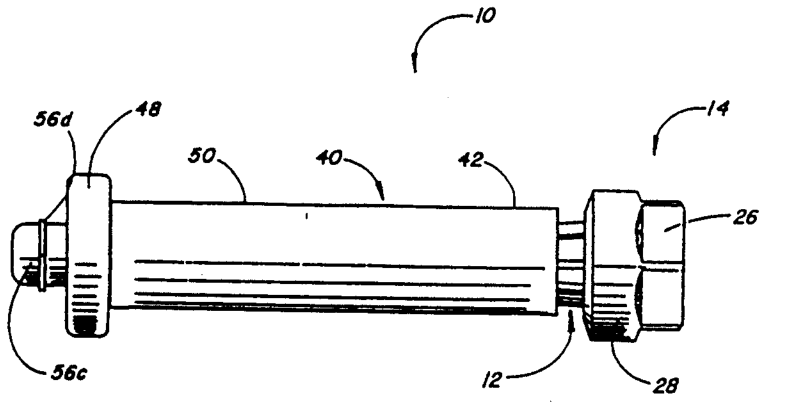
FIG. 4 is a view of the collet tool being pressed upon the free end of the collet.
Figure 5:
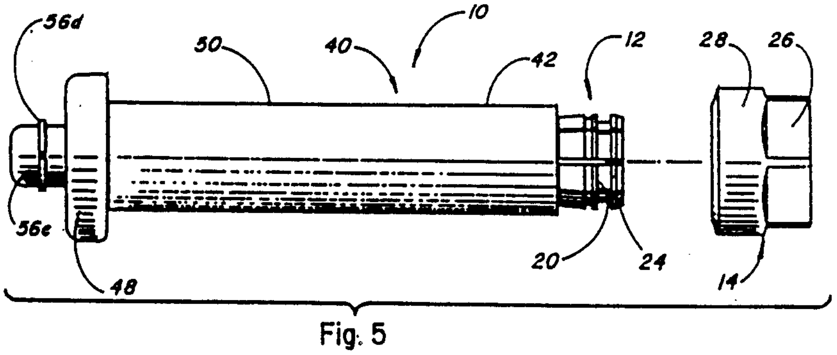
FIG. 5 is a view illustrating the collet removed from the nose piece and lodged within the tool.

To utilize the collet tool 10 to remove collet 12 from a nose piece 14, the tapered free end 22 of the collet 12 is inserted within collet receiving area 44 of the tool (FIG. 4). Next, sleeve 40 is pushed toward the nose piece 14 while the nose piece is held stationary. This results in the collet 12 being forced into the collet receiving area 44 of the sleeve 40. The diameter of the cylindrical opening that forms the collet receiving area 44 is so sized that the tapered rear end portion 22 of the collet can be inserted into the collet receiving area 44 such that the tapered inlet area 46 engages the collet at a selected distance from the rear terminal end of the collet. Once collet tool 10 is pressed toward the nose piece 14, while the nose piece is held relatively stationary with respect to the tool 10, the tapered inlet 46 of the tool exerts a uniform radial compressing action on the collet as the tapered inlet 46 rides up the taper of the collet and moves toward the nose piece 14. This results in the collet 12 being lodged within the collet receiving area 44. In addition, the compression of the collet 12 results in the effective outside diameter of the collet retaining ring 24 being sufficiently reduced such that it becomes completely disengaged from the retaining groove 32 formed within the nose piece 14. This frees the collet 12 from the nose piece 14 and the collet can be removed from the nose piece as illustrated in FIG. 5. Note in FIG. 5 that the collet 12 is tightly secured within collet receiving area 44 due to this lodging action and that its forward end portion 20 projects from the tool.

This tightly secured collet 12 is now in position to either be set aside by the operator or reinserted into a nose piece 14. In order to set aside this secured collet 12 in order to change collet sizes, etc., the user engages the actuator 56c of the plunger, which is then in a retracted position, and pushes the same toward the extended position. As the plunger 56 is pushed toward the extended position, the collet engaging end of the plunger engages the rear terminal end of the collet lodged within the collet receiving end 44. In the embodiment illustrated in FIG. 3, the collet engaging end is designed such that the plunger terminal end 56b is sized to actually extend into the rear portion of the collet 12 while the collar 56a is designed to actually engage the rear circular edge of the collet. It is appreciated that the plunger could be provided with a completely flat collet engaging end. In any event, the individual using the collet tool pushes the plunger against the rear portion of collet 12, causing it to be dislodged from the collet receiving area 44. As collet 12 departs the tool 10, it is appreciated that the same will expand radially and assume its normal no-load size and shape. This free collet may then be set aside. To then engage a free collet not retained in a nose piece into the collet tool 10, the collet receiving area 44 is positioned over the tapered free end 22 of a collet 12. The sleeve 40 is then pushed toward the forward end 20 of the collet 12, while the collet 12 is held relatively stationary with respect to the tool 10, usually by placing the collet 12 on a flat surface such as a table. The tapered inlet 46 of the tool exerts a uniform radial compressing action on the collet 12 as the tapered inlet 46 rides up the taper of the collet 12 toward the forward end 20, resulting in the collet 12 being lodged within the collet receiving area 44.

Figure 6:
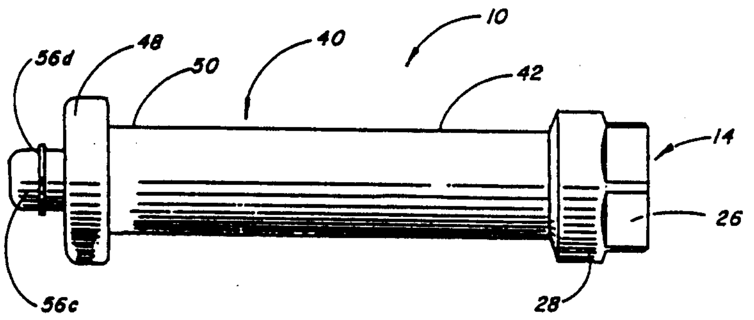
FIG. 6 is a view illustrating the collet tool being positioned adjacent the nose piece just prior to the collet tool ejecting the collet into the nose piece.
Figure 7:
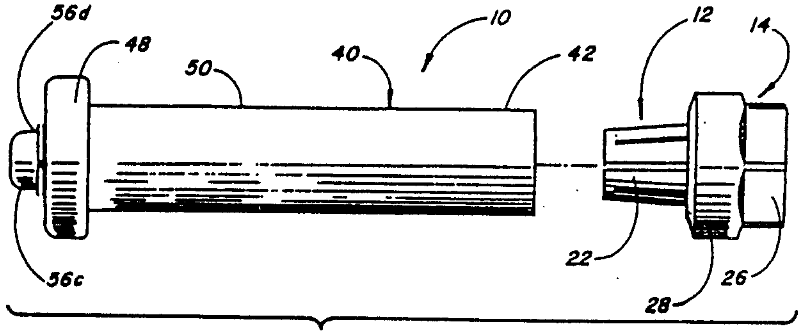
FIG. 7 is a view illustrating the collet tool being removed from the collet which is now retained within the nose piece.

To re-insert the collet 12 into a nose piece 14, the collet tool is positioned adjacent the nose piece such that the forward end portion 20 of the collet 12 is disposed within the nose piece 14 (FIG. 6). At this point, the user engages the actuator end 56c of the plunger, which is then in a retracted position, and pushes the same toward the extended position. As the plunger 56 is pushed toward the extended position, the collet engaging end of the plunger engages the rear terminal end of the collet lodged within the collet receiving end 44. In this manner, the plunger is pushed against the rear portion of collet 12, causing it to be dislodged from the collet receiving area 44. As collet 12 departs the tool 10, it is appreciated that the same will expand radially and assume its normal no-load size and shape. This, of course, results in the collet retaining ring 24 expanding radially outwardly and engaging the retaining groove 32 of the nose piece 14, resulting in the collet being held and confined within the nose piece. Now the collet tool 10 can be pulled from the collet 12 and, as seen in FIG. 7, the collet has now been re-inserted into the nose piece.

From the foregoing specification and discussion, it is appreciated that the collet tool 10 of the present invention enables one to quickly and easily remove a collet from a nose piece, as well as re-insert that same collet or another collet back into the nose piece. Of particular significance is the fact that collet tool 10 is designed to apply a uniform compressing action to the collet 12 during the removal process. This obviously avoids unnecessary damage to the collet.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A method of removing a collet from a circumferential retainer wherein a first end portion of the collet includes a retainer ring which is confined within a circular groove formed in the circumferential retainer and wherein the collet includes a second tapered end portion whose outside diameter increases toward the first end portion, the method including:

(a) inserting the second end portion of said collet into an open sleeve forming a part of a collet tool;

(b) moving the sleeve over the second end portion toward the first end portion of the collet and engaging the outside surface of the collet with the sleeve such that the collet is radially compressed as the sleeve is moved over the collet;

(c) compressing the collet including reducing an effective diameter of the retaining ring associated with the collet thereby releasing said retainer ring from the groove of the circumferential retainer;

(d) lodging the collet within the sleeve as the sleeve is pushed toward the first end portion and pulling the collet from the retainer while lodged within the sleeve;

(e) engaging the lodged collet with a collet ejector associated with the tool; and (f) pushing the collet out of the sleeve by pushing the collet ejector against the collet thereby dislodging and axially moving said collet from the sleeve.

2. A method of removing a collet from a circumferential retainer comprising the steps of:

(a) inserting an end portion of the collet into a collet receiving area of a collet tool;

(b) pressing the collet receiving area of the collet tool over the end of the collet and thereby radially compressing the collet;

(c) releasing the collet from the retainer as a result of the collet being compressed and retaining the collet within the collet receiving area of the tool;

(d) engaging the collet with a collet ejector associated with the collet tool; and (e) pushing the collet ejector against the collet within the collet receiving area of the tool and thereby pushing the collet from the tool, wherein the collet includes a first end portion confined with a holding groove formed within the circumferential retainer and a second end portion having an outside diameter that progressively increases toward the first end portion; and wherein said inserting step includes inserting the second end portion into the collet receiving area of the tool and said pressing step includes moving the collet receiving area relative to the collet and toward the first end portion thereby decreasing an outside diameter of the first end portion held within the holding groove thereby completely withdrawing said collet from the circumferential retainer.

* * * * *